May 3, 1927.
A. KÉGRESSE
1,627,287
ENDLESS SUPPORTING AND DRIVING FLEXIBLE BELT FOR MOTOR AND OTHER VEHICLES
Filed May 24, 1921   2 Sheets-Sheet 1
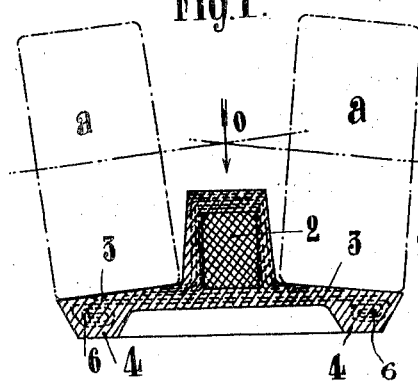
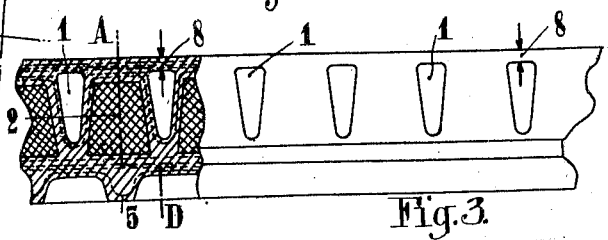
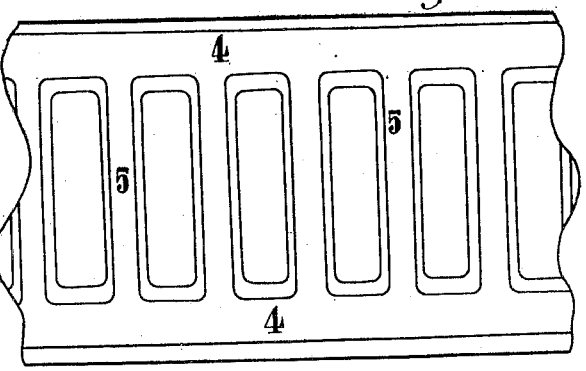
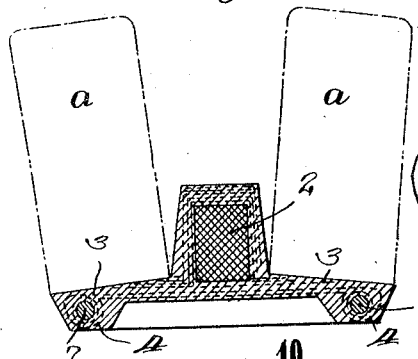
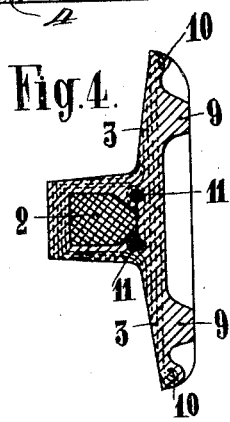
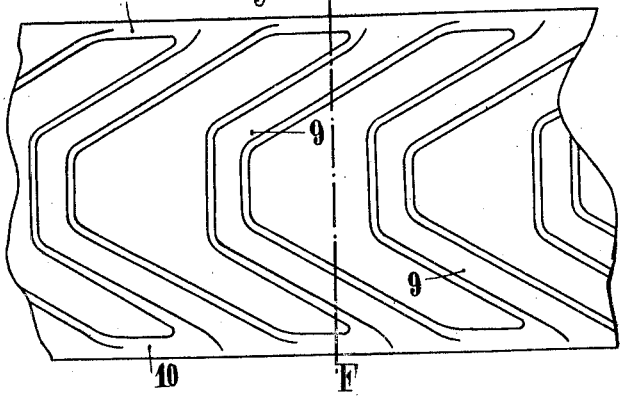
INVENTOR
Adolphe Kégresse
BY
ATTORNEY Patented May 3, 1927.

1,627,287

UNITED STATES PATENT OFFICE.

ADOLPHE KÉGRESSE, OF PARIS, FRANCE.

ENDLESS SUPPORTING AND DRIVING FLEXIBLE BELT FOR MOTOR AND OTHER VEHICLES.

Application filed May 24, 1921, Serial No. 472,200, and in France June 5, 1920.

It will be readily understood that flexible endless belts for vehicles, such as for instance that of the type disclosed in my prior application, No. 457,110, filed March 30, 1921, must have special qualities which are not demanded from ordinary belts: they must have a great strength, a great resistance to wear on all the faces, the greatest flexibility for facilitating the passage of the belt around the driving wheel and across the wheel for supporting and stretching the belt, a limited flexibility in the two sections, so as to offer for the bottom section, under each supporting or bearing wheel considered separately, chiefly during the passage of the belt over obstacles, as small an angle of approach as possible, independently of the diameter of the wheel in question, and for the upper section, the least idle movement.

On the other hand, as the driving of the belt must not be at the mercy of a variation of the coefficient of adhesion which, as is known, may drop very low owing to the conditions of work, such driving must be effected by means of suitable mechanisms, an example of which will be found in my companion prior application No. 457,109 filed March 30, 1922, which result in causing certain portions of the belt to work in an entirely special manner. These parts must therefore be provided and combined with the rest of the belt in order to fulfill the object to be attained.

Finally, it is desirable to suppress, or at least to reduce the lateral friction of the belt against the wheels which is very injurious and considerable in belts of the type indicated.

Figures 1 to 3 show a belt of heavy type for use over any ground, Fig. 1 being a transverse section of the belt taken on line A—D of Fig. 2; Fig. 1ᴬ, a view similar to Fig. 1, but showing a slight modification; Fig. 2, a part-sectional side elevation; and Fig. 3, a bottom plan view of Fig. 2.

Figures 4 and 5 are, respectively, a cross-section on line E—F, Fig. 5, and a bottom plan view of a modified construction especially designed for use on loose ground, sand, grass, marshy ground, etc.

Figure 6:
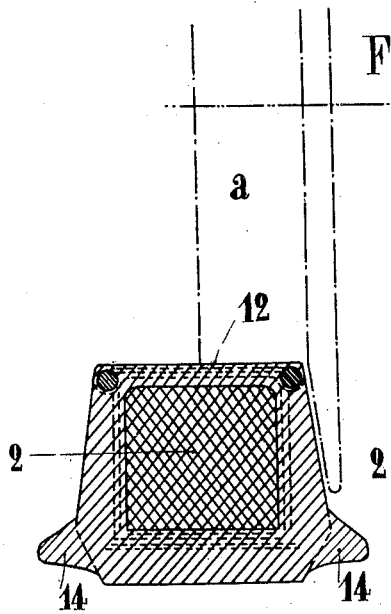
Figures 6–8 are a cros-section and two elevations, one of which is partly in section, showing a belt for hard ground, applicable to vehicles of a rather reduced tonnage.

The belts according to the invention, are chiefly made of rubber, of strong canvas and of cores of a semi-rigid material, the whole vulcanized under a strong pressure in a special mould.

The projecting central part of the belt, which extends throughout the whole length of the belt and is intended to guide and to drive the belt, is provided with transverse openings 1 (Figure 2) of triangular shape. Between the said openings are enclosed cores 2 of a semi-flexible material (Figures 1, 1ᴬ, 2, 4, 6 and 7) such as for instance compressed cork, paper, wood, etc., the shape of which can vary. These cores are faced or covered with canvas on all their faces, as may be seen in section in Figures 1, 1ᴬ, 2, 4, 6 and 7.

The supporting wheels or rollers $a$ of the machine rest squarely on flat parts 3 (Figures 1, 1ᴬ, and 4) which are parallel not to the ground, but to the axes of the rollers, which axes intersect each other at the point $o$ (Figure 1).

The surface of the belt which comes in contact with the ground, comprises, in the construction shown in Figures 1–3, two continuous treads 4 (Figures 1, 1ᴬ and 3) transversely connected together by rigs 5, the arrangement of which can be greatly varied (see my previously-mentioned application No. 457,110). These ribs 5 can be provided inside with strong canvas, a diagrammatic arrangement of which is shown in Figure 2. The treads are provided with internal strengthening cores constituted either by the edges of the canvas folded several times as shown at 6 (Figure 1) or by a round or oval cable 7 (Fig. 1ᴬ) of metal, hemp, etc., protected by the canvas.

Between each layer of canvas is interposed a thin layer of rubber. The outer surface of the whole belt is also covered with rubber, the quantity and quality of which vary with the functions that each element of the belt has to fulfill.

As may be seen, the desired strength of the belt is ensured by a judicious arrangement of the canvas and cables mentioned in the foregoing. The wear is counteracted by the size of the bearing surfaces formed by the treads 4 and the ribs 5 (Figure 3).

Flexibility during the rolling of the belt over large wheels or drums is not affected, as the thin parts 8 (Figure 2) made of flexible canvas, can flex or fold upon themselves without any difficulty.

The limited flexibility in the other direction is obtained by means of the same thin parts 8 which this time are exposed to elongation and do not allow the belt to assume, between two wheels or rollers, any injurious deformation. In other words, the belt is perfectly flexible or supple only in the direction of its passage over the large wheels.

It will be readily understood that for the same reason the idle movement or "floating" of the upper section is reduced because, in short, it can take place only in one direction.

The driving is effected, as is known, by means of the projecting part of the belt, the inner cores 2 of which (Figures 1, 1ᴬ, 2, 4, 6 and 7) resist the internal pressure of the driving system.

As regards lateral friction, it is practically eliminated owing to the inclination of the bearing surfaces 3 (Figures 1, 1ᴬ and 4) which, under the action of the load transmitted to the rollers a, always have the tendency to maintain the endless band in the normal plane of movement. When turning corners, lateral friction being nevertheless unavoidable, it is reduced to a minimum because the inner cheeks of the wheels or rollers form with the corresponding faces of the guide blocks of the belt a fairly great angle, from which it follows that no contact can take place except at the very base of the guide blocks, that is to say at a point very close to the circumference of the rollers.
The cycloidal friction is thereby practically suppressed.

The belt shown in Figures 4 and 5 is characterized by the fact that instead of being provided with a continuous outer tread, it has ribs 9 (Figures 4 and 5) shown here in the shape of truncated chevrons interfitting one another. The edges of the belt are formed by a slight outer strengthening flange 10 (Figure 4) containing as before a canvas core or a cable. The belt could be further strengthened by means of other cables 11 (Figure 4) whether covered with canvas or not, and connected together by it or not, the number and the arrangement of the cables being any desired.

Figure 7:
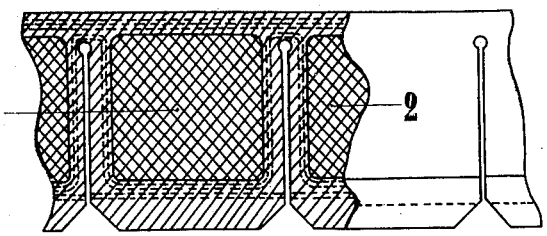
Figure 8:
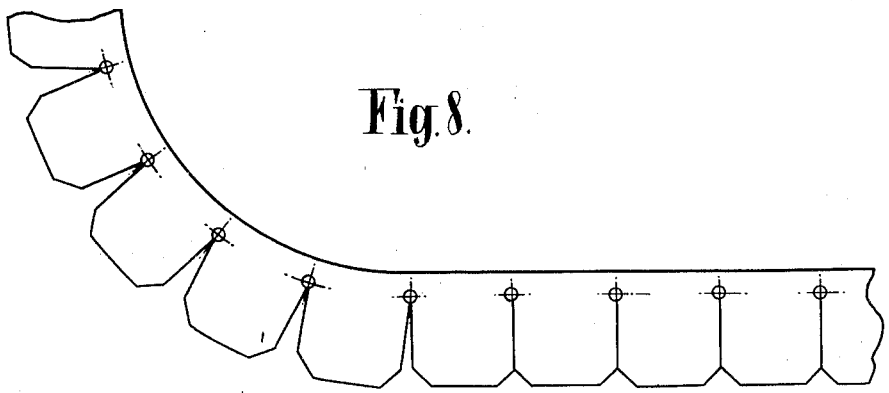

The belt of Figures 6–8 is characterized by the fact that the guide-blocks rest direct on the ground and are "grafted" on several endless layers of canvass forming the core of the belt. The canvas layers which are lined with rubber which insulates them from each other, form the track 12 for the rollers.

The face of the blocks in contact with the ground can be of course provided with all sorts of patterns in relief or in intaglio in order to increase the adhesion. The bases of the said blocks may be beveled at their edges, as shown in Figures 6–8, or the said edges may be rounded off, etc.

Flaps 14 (Figure 6) could be provided for increasing the bearing surface on loose ground, without their working when on hard ground. It will be understood in fact that the said flaps, which are spaced from the outer surfaces of the blocks, will automatically become operative as soon as the lower portions of the blocks begin to sink in.

In belts of small dimensions appliable to light weight vehicles, the semi-elastic cores 2 (Figures 1, 1ᴬ, 2, 4, 6 and 7) could be done away with, and the blocks constituted merely by canvas and rubber. In all the belts, the outer treads could be strengthened by metal parts, such as for instance studs.

I claim as my invention:

1. An endless, flexible supporting and driving belt for motor and other vehicles, consisting of layers of canvas and rubber vulcanized together under high pressure, said belt embodying counterpart, spaced transverse portions each containing an internal block of semi-elastic material.

2. An endless, flexible supporting and driving belt for motor and other vehicles, consisting of layers of canvas and rubber vulcanized together under high pressure, said belt embodying counterpart, spaced transverse portions each containing an internal block of semi-elastic material having canvas-faced surfaces.

3. An endless, flexible supporting and driving belt for motor and other vehicles, provided on its inner surface with a continuous median projecting portion having blocks of semi-elastic material embedded in it at intervals.

4. A belt according to claim 3, in which the projecting portion has openings formed transversely through it at intervals, and in which the blocks are interposed between said openings.

5. An endless, flexible supporting and driving belt for motor and other vehicles, provided on its inner surface with a continuous median projecting portion having openings formed transversely through it at intervals, and blocks of semi-elastic material embedded in said projecting portion between said openings, said blocks having canvas-faced surfaces.

6. An endless, flexible supporting and driving belt for motor and other vehicles, provided on its inner surface with a continuous median projecting portion having blocks of semi-elastic material embedded therein, said blocks having canvas-faced surfaces.

7. An endless, flexible supporting and driving belt for motor and other vehilcles, consisting of canvas and rubber vulcanized together under high pressure, said belt embodying counterpart, spaced transverse portions each containing an internal block of semi-elastic material, and endless strengthening cables extending along the edges of the belt.

8. A track belt for automobiles, comprising an endless, flexible band having on its inner surface an endless projecting portion spaced midway between the edges thereof and adapted to engage the peripheral surfaces of the driving wheels around which the belt is to pass, so as to guide the belt in its movements; said band having on opposite sides of said projecting portion continuous plane portions which are inclined outwardly transversely of the band and which are adapted for engagement by the inclined guide rollers that distribute the load over the driving stretch of the belt, said inclined portions having the same degree of inclination as the axes of the guide rollers.

In testimony whereof I have signed this specification.

ADOLPHE KÉGRESSE.